United States Patent [19]

Yoshimura et al.

[11] Patent Number: 4,938,100

[45] Date of Patent: Jul. 3, 1990

[54] CONTROL SYSTEMS FOR VEHICLE ENGINES COUPLED WITH AUTOMATIC TRANSMISSIONS

[75] Inventors: Hiroshi Yoshimura; Keiji Bota; Kazuo Takemoto, all of Hiroshima; Fumiaki Baba, Higashihiroshima, all of Japan

[73] Assignee: Mazada Motor Corporation, Hiroshima, Japan

[21] Appl. No.: 347,028

[22] Filed: May 4, 1989

[30] Foreign Application Priority Data

May 18, 1988 [JP] Japan ................................. 63-121199

[51] Int. Cl.$^5$ .............................................. B60K 41/18
[52] U.S. Cl. ......................................... 74/860; 74/858
[58] Field of Search .................. 74/857, 858, 859, 860

[56] References Cited

U.S. PATENT DOCUMENTS 4,226,141 10/1980 Espenschied ...................... 74/859 X
4,596,164  6/1986 Hasegawa et al. ................... 74/860
4,630,583 12/1986 Suzuki et al. ...................... 74/860 X
4,688,450  8/1987 Hayashi et al. .................... 74/858 X
4,713,763 12/1987 Hofman ............................. 74/860 X
4,723,643  2/1988 Numazawa et al. ............... 74/858 X
4,724,723  2/1988 Lockhart et al. .................. 74/857 X

FOREIGN PATENT DOCUMENTS 0228899 7/1987 European Pat. Off. .

OTHER PUBLICATIONS

Japanese Patent Abstract (Purpose and Constitution) for Japanese Publication 61-104128, May 22, 1986.

Primary Examiner—Dirk Wright
Attorney, Agent, or Firm—Sixbey, Friedman, Leedom & Ferguson

[57] ABSTRACT

A control system for a vehicle engine coupled with an automatic transmission, which comprises a torque controller operative to vary torque produced by the vehicle engine, in accordance with a controlled variable, so as to suppress torque shock resulting from a speed change operation carried out to vary a gear ratio in a power transmitting gear arrangement provided in the automatic transmission, an operation detector for detecting the speed change operation, a controlled variable setting device for determining the controlled variable in accordance with an operating condition of the vehicle engine and the speed change operation, and a controlled variable revising device for varying the controlled variable so as to reduce variation in the torque brought about by the torque controller under a condition in which the speed change operation causing a change from one to another of speed ranges of relatively small gear ratios is detected by the operation detector, as compared with variation in the torque brought about by the torque controller under a condition in which the speed change operation causing a change from one to another of speed ranges of relatively large gear ratios is detected by the operation detector.

13 Claims, 6 Drawing Sheets

FIG. 1
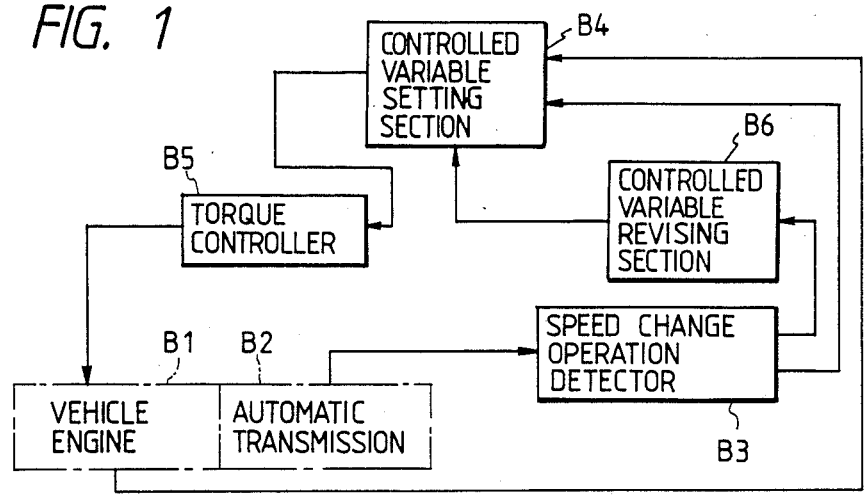
FIG. 5A $T_h$
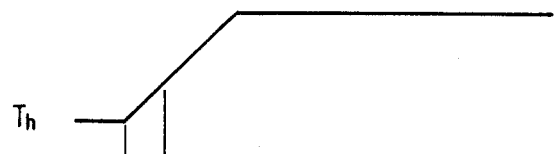
FIG. 5B $P_j$
FIG. 5C $\theta_A$
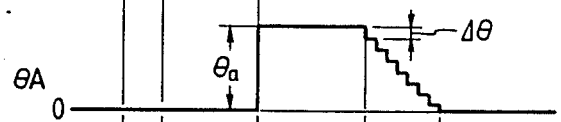
FIG. 5D $T_R$
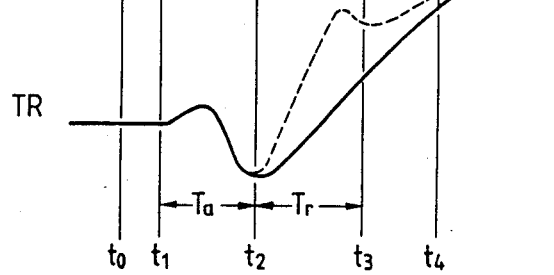

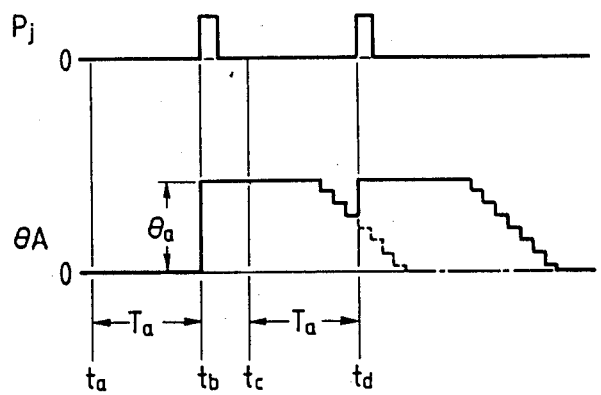
FIG. 7A
FIG. 7B
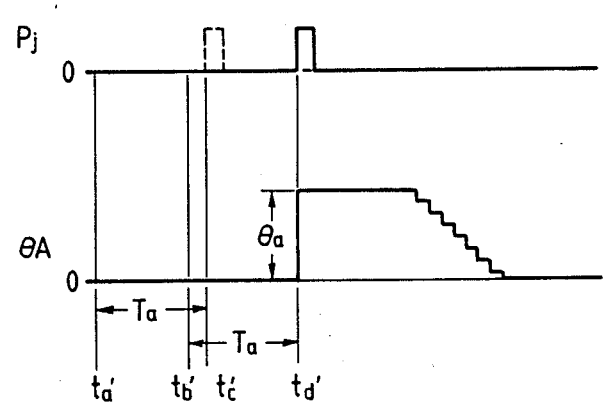
FIG. 8A
FIG. 8B

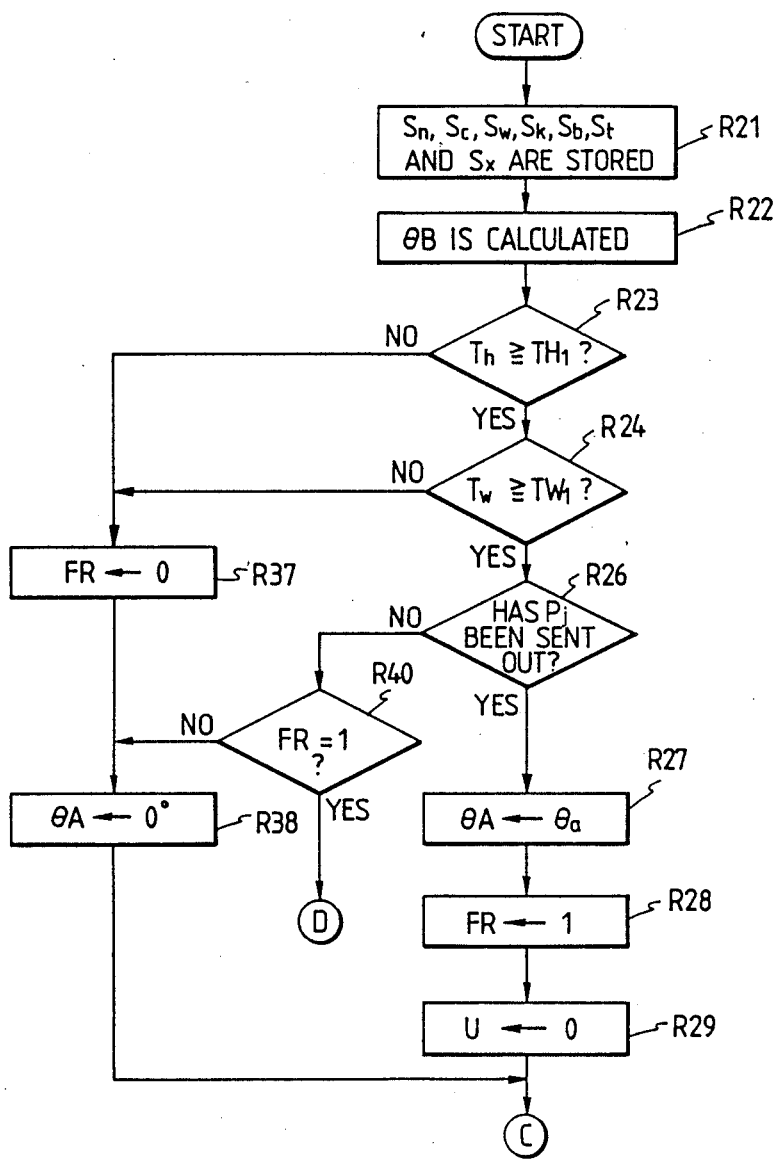
FIG. 10-a

FIG. 10-b
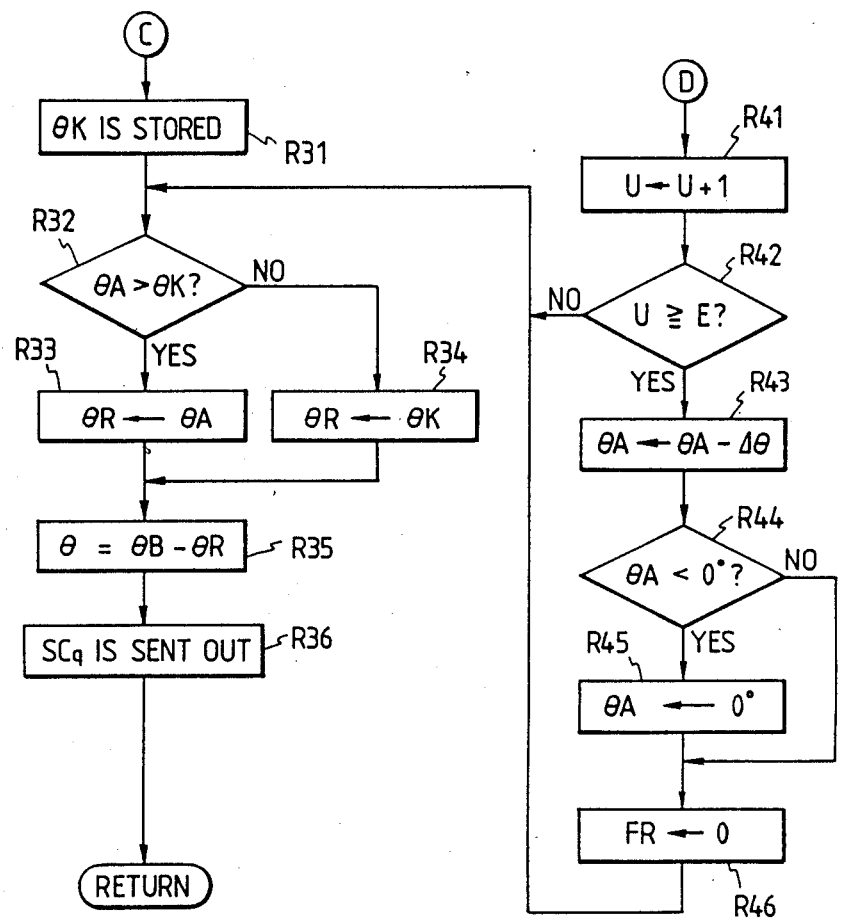

CONTROL SYSTEMS FOR VEHICLE ENGINES COUPLED WITH AUTOMATIC TRANSMISSIONS

BACKGROUND OF THE INVENTION

1. Field of the Invention

The present invention relates generally to control systems for vehicle engines coupled with automatic transmissions, and more particularly, to a system for controlling an output of a vehicle engine which is coupled with an automatic transmission employed in a vehicle so as to suppress torque shocks brought about by speed change operations performed in the automatic transmission.

2. Description of the Prior Art

There has been commonly used in vehicles an automatic transmission which is coupled with an engine provided in the vehicle and includes a torque converter comprising a pump impeller, a turbine runner and a stator, and a power transmitting gear arrangement including a speed change mechanism connected to the turbine runner in the torque converter. Such an automatic transmission employed to be coupled with the engine in the vehicle is usually accompanied with a hydraulic pressure control device including an oil hydraulic control circuit, by which engaging friction elements, such as clutch and brake elements, operating with oil pressure in the speed change mechanism are caused to work for a speed change operation.

When the speed change operation is carried out in the automatic transmission accompanied with the hydraulic pressure control device, sudden rise or down in speed of the engine is caused in response to variations in gear ratio in the speed change mechanism and thereby sudden variations in torque are caused on an output shaft of the automatic transmission. This results in that torque shock on the vehicle is brought about by each speed change operation performed in the automatic transmission.

With the intention of suppressing the torque shock resulting from the speed change operation, it is considered to adjust oil pressure applied to the engaging friction elements so that each engaging friction element comes into engagement or disengagement gradually and smoothly. In such a case, however, a period of time in which the engaging friction element is kept in a slipping condition in process of the speed change operation is protracted and therefore it is feared that the engaging friction element is subjected to seizing and abrasion of great degree.

In view of this, there has been proposed to reduce torque produced by the engine (engine torque) for a predetermined duration on the occasion of the speed change operation so as to suppress the torque shock resulting from the speed change operation, as disclosed in, for example, the Japanese patent application published before examination under publication number 61-104128. In the case where the engine torque is thus reduced for suppressing the torque shocks, for example, ignition timing is selected as a controlled subject for varying the engine torque and controlled to be retarded, compared with a normal ignition timing, so as to reduce the engine torque during the speed change operation.

Usually, in the vehicle which is equipped with the engine coupled with the automatic transmission, a variation in gear ratio in the speed change mechanism caused on the occasion of a speed change between high speed ranges each provided with a relatively small gear ratio is smaller than a variation in gear ratio in the speed change mechanism caused on the occasion of a speed change between low speed ranges each provided with a relatively large gear ratio. Further, in a condition in which the high speed range is taken in the speed change mechanism, rotary inertia on an output shaft of the automatic transmission is relatively large compared with that in a condition in which the low speed range is taken in the speed change mechanism, so that variations in torque on the output shaft of the automatic transmission are restricted and therefore the torque shock on the vehicle is substantially reduced.

Besides, when the high speed range is taken in the speed change mechanism, the vehicle is, in general, traveling at high speed and therefore it is to be understood that to prevent the engine torque from being reduced takes precedence of to suppress the torque shock resulting from the speed change operation. Especially, in the case where a shifting-down operation for causing a change from a speed range of the smallest gear ratio, for example, the fourth speed range to a speed range of the second smallest gear ratio, for example, the third speed range is carried out in the automatic transmission, the vehicle is likely to require to be accelerated to pass another vehicle ahead and therefore it is desirable that the control for reducing the engine torque so as to suppress the torque shock resulting from the speed change operation is not performed.

However, in the prior art, the above mentioned differences between the speed change operation causing the change from one to another of the low speed ranges and the speed change operation causing the change from one to another of the high speed ranges, has not been taken into consideration and a controlled variable in the control for reducing the engine torque so as to suppress the torque shock resulting from the speed change operation is set to be constant regardless of a mode of the speed change operation. Accordingly, in the case where the speed change between the high speed ranges is brought about in the automatic transmission, it is feared that the controlled variable in the control for reducing the engine torque so as to suppress the torque shock resulting from the speed change operation is large excessively and thereby excessive reduction of the engine torque is induced so that required engine torque can not be obtained.

OBJECTS AND SUMMARY OF THE INVENTION

Accordingly, it is an object of the present invention to provide a control system for a vehicle engine coupled with an automatic transmission, in which a control for varying torque produced by the vehicle engine so as to suppress torque shock resulting from a speed change operation carried out in the automatic transmission are performed, and which avoids the aforementioned disadvantages and problems encountered with the prior art.

Another object of the present invention to provide a control system for a vehicle engine coupled with an automatic transmission, in which a control for varying torque produced by the vehicle engine so as to suppress torque shock resulting from a speed change operation carried out in the automatic transmission is performed and the torque shock is suppressed sufficiently without inducing excessive reduction of the torque produced by the vehicle engine on the occasion of the speed change operation.

In accordance with the present invention, there is provided a control system for a vehicle engine coupled with an automatic transmission comprising a torque controller operative to vary torque produced by the vehicle engine, in accordance with a controlled variable determined for controlling the torque, so as to suppress torque shock resulting from a speed change operation carried out in the automatic transmission, a speed change operation detector for detecting the speed change operation carried out to vary a gear ratio in a power transmitting gear arrangement provided in the automatic transmission, a controlled variable setting device for determining the controlled variable based on an operating condition of the vehicle engine and the speed change operation carried out in the automatic transmission, and a controlled variable revising device for varying the controlled variable so as to reduce variation in the torque brought about by the torque controller under a condition in which the speed change operation causing a change from one to another of speed ranges of relatively small gear ratios is detected by the speed change operation detector, as compared with variation in the torque brought about by the torque controller under a condition in which the speed change operation causing a change from one to another of speed ranges of relatively large gear ratios is detected by the speed change operation detector.

In one embodiment control system for a vehicle engine coupled with an automatic transmission according to the present invention, the controlled variable revising device is operative to vary the controlled variable so as to cause the variation in the torque brought about by the torque controller to be substantially zero when a shifting-down operation causing a change from a speed range of the smallest gear ratio to a speed range of the second smallest gear ratio is detected by the speed change operation detector.

With the control system thus constituted in accordance the present invention, on the occasion of the speed change operation carried out to cause the change between the speed ranges of relatively large gear ratios in the automatic transmission, the variation in the torque produced by the vehicle engine is brought about by the torque controller without being reduced and thereby the torque shock resulting from the speed change operation is suppressed sufficiently. On the other hand, when the speed change operation is carried out to cause the change between the speed ranges of relatively small gear ratios in the automatic transmission and therefore the torque shock resulting from the speed change operation is substantially reduced, the variation in the torque brought about by the torque controller is reduced so as to restrain reduction of the torque and thereby excessive reduction of the torque produced by the vehicle engine is prevented so that required torque can be obtained from the vehicle engine.

The above, and other objects, features and advantages of the present invention will become apparent from the following detailed description which is to be read in conjunction with the accompanying drawings.

BRIEF DESCRIPTION OF THE DRAWINGS

FIG. 1 is a block diagram illustrating the basic arrangement of a control system for a vehicle engine coupled with an automatic transmission according to the present invention;

FIGS. 5A to 5D, 6A to 6D, 7A, 7B, 8A and 8B are time charts used for explaining the operation of the embodiment shown in FIG. 2; and FIGS. 9, 10-$a$, 10-$b$ and 11 are flow charts showing examples of operational programs for a microcomputer used in a control unit employed in the embodiment shown in FIG. 2.

DESCRIPTION OF THE PREFERRED EMBODIMENTS

FIG. 1 illustrates a functional block diagram of a system incorporating the present invention. In the functional block diagram of FIG. 1, the system comprises a vehicle engine B1 coupled with an automatic transmission B2, a speed change operation detector B3, a controlled variable setting section B4, a torque controller B5, and a controlled variable revising section B6.

The speed change operation detector B3 is operative to detect a speed change operation carried out to vary a gear ratio in a power transmitting gear arrangement provided in the automatic transmission B2. The controlled variable setting section B4 is operative to determine a controlled variable for controlling torque produced by the vehicle engine B1 based on an operating condition of the vehicle engine B1 and the speed change operation carried out in the automatic transmission B2. The torque controller B5 is operative to vary the torque produced by the vehicle engine B1, in response to the controlled variable which is determined by the controlled variable setting section B4, so as to suppress torque shock resulting from the speed change operation carried out in the automatic transmission B2. Then, the controlled variable revising section B6 is operative to vary the controlled variable, which is determined by the controlled variable setting section B4, so as to reduce variation in the torque brought about by the torque controller B5 under a condition in which the speed change operation causing a change from one to another of speed ranges of relatively small gear ratios is detected by the speed change operation detector B3, as compared with variation in the torque brought about by the torque controller B5 under a condition in which the speed change operation causing a change from one to another of speed ranges of relatively large gear ratios is detected by the speed change operation detector B3.

Figure 2:
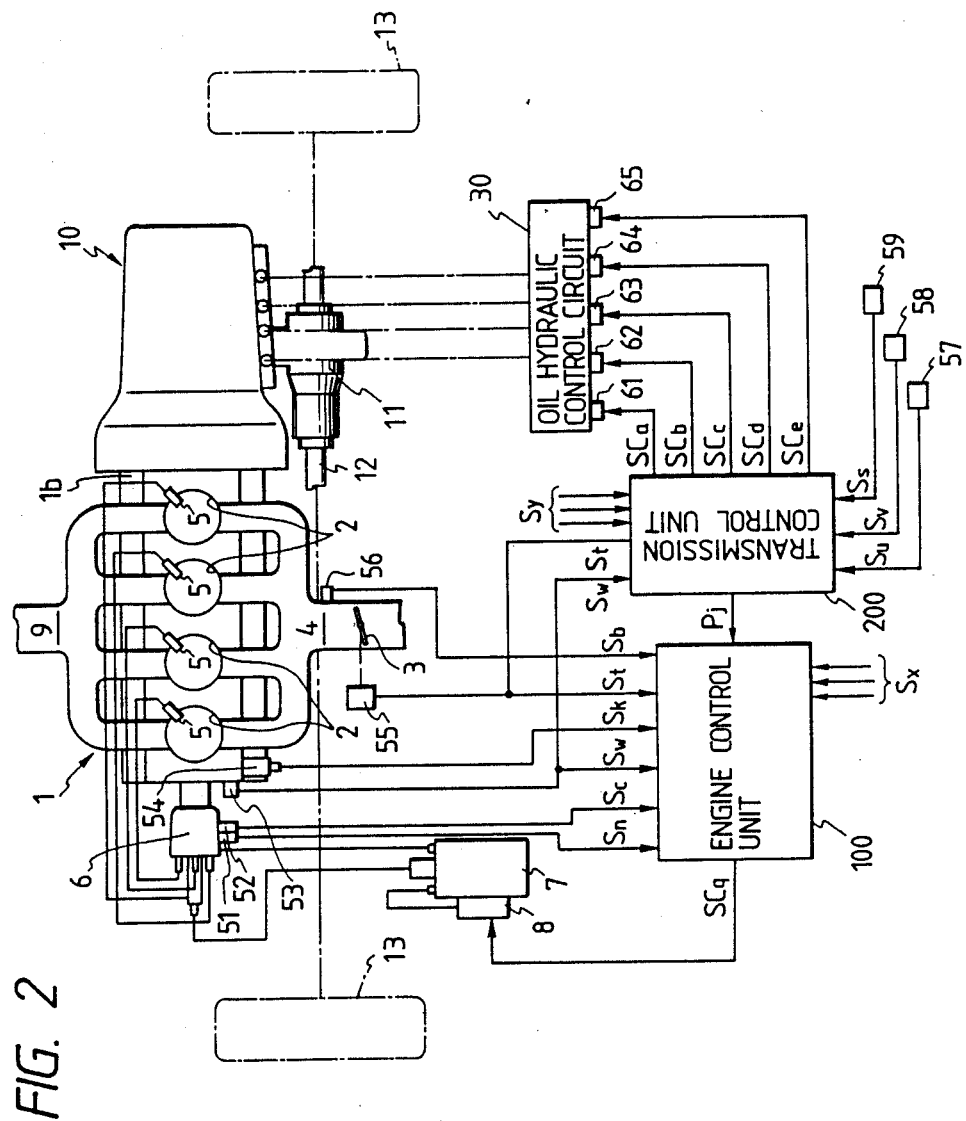
FIG. 2 is a schematic illustration showing one embodiment of control system for a vehicle engine coupled with an automatic transmission according to the present invention, together with essential portions of a vehicle engine to which the embodiment is applied.

FIG. 2 illustrates an embodiment of control system for a vehicle engine coupled with an automatic transmission according to the present invention, together with a vehicle engine which is mounted on a vehicle of the front engine front drive type and to which the embodiment is applied.

Referring to FIG. 2, a vehicle engine 1 has four cylinders 2 each supplied with air-fuel mixture through an intake passage 4 provided with a throttle valve 3. The air-fuel mixture taken in each of the cylinders 2 is subjected to combustion caused by the operation of an ignition system including spark plugs 5, a distributor 6, an ignition coil 7 and an igniter 8, and exhaust gas resulted from the combustion is discharged through an exhaust passage 9. With such combustion of the air-fuel mixture in each of the cylinders 2, a torque is produced on a crank shaft of the vehicle engine 1. The torque obtained from the vehicle engine 1 is transmitted through an automatic transmission 10 which is coupled with the vehicle engine 1, a differential gear mechanism 11 and a front axle 12 to a couple of front wheels 13.

Figure 3:
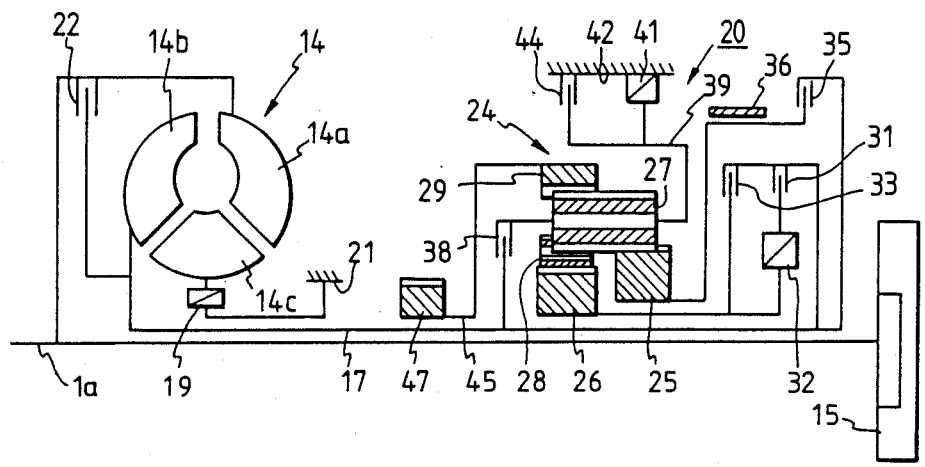
FIG. 3 is a schematic illustration showing an example of an automatic transmission accompanying with the engine to which the embodiment shown in FIG. 2 is applied.

The automatic transmission 10 is accompanied with an oil hydraulic control circuit 30 provided with solenoid valves 61, 62, 63, 64 and 65 for supplying various portions of the automatic transmission 10 selectively with operating oil pressure and, as shown in FIG. 3, comprises a torque converter 14 and a power transmitting gear arrangement 20. The torque converter 14 comprises a pump impeller 14a, a turbine runner 14b, a stator 14c and a case 21. The pump impeller 14a is secured to a crank shaft 1a of the vehicle engine 1 on which an oil pump 15 is mounted. The turbine runner 14b is coupled through a tubular turbine shaft 17 with the power transmitting gear arrangement 20 and coupled also through a lock-up clutch 22 with the crank shaft 1a. The stator 14c is coupled rotatably through a one-way clutch 19 with the case 21 and the one-way clutch 19 permits the stator 14c to revolve only in a direction common to the revolution of the pump impeller 14a.

The power transmitting gear arrangement 20 is provided with a planetary gear unit 24 for obtaining four forward speeds and one reverse speed. The planetary gear unit 24 comprises a large sun gear 25, a small sun gear 26, a long pinion gear 27, a short pinion gear 28 and a ring gear 29. A series connection of a forward clutch 31 for forward traveling and a one-way clutch 32 is disposed in parallel with a coast clutch 33 between the small sun gear 26 and the tubular turbine shaft 17. A reverse clutch 35 for reverse traveling and a 2-4 brake device 36 are connected in series between the large sun gear 25 and the tubular turbine shaft 17. A 3-4 clutch 38 is provided between the long pinion gear 27 and the tubular turbine shaft 17, and the long pinion gear 27 is coupled through a carrier 39 of the planetary gear unit 24 and a one-way clutch 41 with a case 42 of the power transmitting gear arrangement 20. The carrier 39 is selectively engaged through a low/reverse brake device 44 with the case 42. The ring gear 29 is connected through an output shaft 45 of the planetary gear unit 24 to an output gear 47, so that the torque obtained on the output shaft 45 is transmitted through idlers or the like to the differential gear mechanism 11.

In the power transmitting gear arrangement 20 constituted as described above, a plurality of shift positions including P (parking) position, R (reverse) position, N (neutral) position, D (driving) position, 1st position and 2nd position, and a plurality of speed range including first to fourth speed ranges at the D position, first to third speed ranges at the 2nd position, and first and second speed ranges at the 1st position, are obtained by causing the forward clutch 31, coast clutch 33, reverse clutch 35, 3-4 clutch 38, 2-4 brake device 36 and low/reverse brake device 44, each of which is formed into an engaging friction element, to work selectively. The first and second speed ranges are provided with relatively large gear ratios, respectively, and the third and fourth speed ranges are provided with relatively small gear ratios, respectively. The gear ratios provided for the first to fourth speed ranges respectively are decreased in order.

In the following Table 1, there are given the relationship in operation of the respective shift positions and speed ranges with the clutches and brake devices in the above configuration:

Table 1

| Shift position | Speed range | Clutch | | | | Brake device | | One-way clutch | |
|---|---|---|---|---|---|---|---|---|---|
| | | 31 | 33 | 38 | 35 | 36 | 44 | 32 | 41 |
| P | | | | | | | | | |
| R | | | | | o | | o | | |
| N | | | | | | | | | |
| D | 1st speed | o | | | | | | o | o |
| | 2nd speed | o | | | | o | | o | |
| | 3rd speed | o | o | o | | | | o | |
| | 4th speed | o | | o | | o | | (o) | |
| 2nd | 1st speed | o | | | | | | o | o |
| | 2nd speed | o | o | | | o | | o | |
| | 3rd speed | o | o | o | | | | o | |
| 1st | 1st speed | o | o | | | | o | o | |
| | 2nd speed | o | o | | | o | | o | |

In Table 1, each circular mark:o represents that the device is held in engagement to transmit power and a parenthesized circular mark:(o) represent that the device is held in engagement without participating in power transmission.

The operating oil pressure for working each of the clutches 31, 33, 38 and 35 and the brakes 36 and 44 is produced in the oil hydraulic control circuit 30.

In the embodiment shown in FIG. 2, an engine control unit 100 which contained a microcomputer and a transmission control unit 200 which contains also a microcomputer are provided for controlling the operation of a combination of the vehicle engine 1 and the automatic transmission 10 constituted as described above.

The engine control unit 100 is supplied with a detection output signal Sn obtained from an engine speed sensor 51 provided on the distributor 6, a detection output signal Sc obtained from a crank angle sensor 52 provided on the distributor 6, a detection output signal Sw obtained from a temperature sensor 53 provided on an engine block 1b, a detection output signal Sk obtained from a knocking sensor 54 provided on the engine block 1b, a detection output signal St obtained from a throttle sensor 55, a detection output signal Sb obtained from a negative pressure sensor 56 disposed at a portion of the intake passage 4 downstream to the throttle valve 3 and other necessary detection output signals Sx, and operative to generate an ignition control signal SCq based on the detection output signals Sn, Sc, Sw, Sk, St and Sb and a command pulse signal Pj which is supplied selectively to the engine control unit 100 from the transmission control unit 200 and to supply the igniter 8 with the ignition control signal SCq so as to perform an ignition timing control.

The transmission control unit 200 is supplied with the detection output signal Sw from the temperature sensor 53, the detection output signal St from the throttle sensor 55, a detection output signal Su obtained from a turbine speed sensor 57, a detection output signal Sv obtained from a speed sensor 58, a detection output signal Ss obtained from a shift position sensor 59 and other necessary detection output signals Sy, and operative to supply the solenoid valves 61 to 65 respectively with driving pulse signals SCa, SCb, SCc, SCd and SCe produced based on the detection output signals Sw, St, Su, Sv and Ss so as to perform a speed change control for the automatic transmission 10 in which each of the clutches 31, 33, 38 and 35 and the brakes 36 and 44 is selectively engaged in such a manner as shown in Table 1 and further a lock-up control in which the lock-up clutch 22 provided in the torque converter 14 is selectively engaged.

Figure 4:
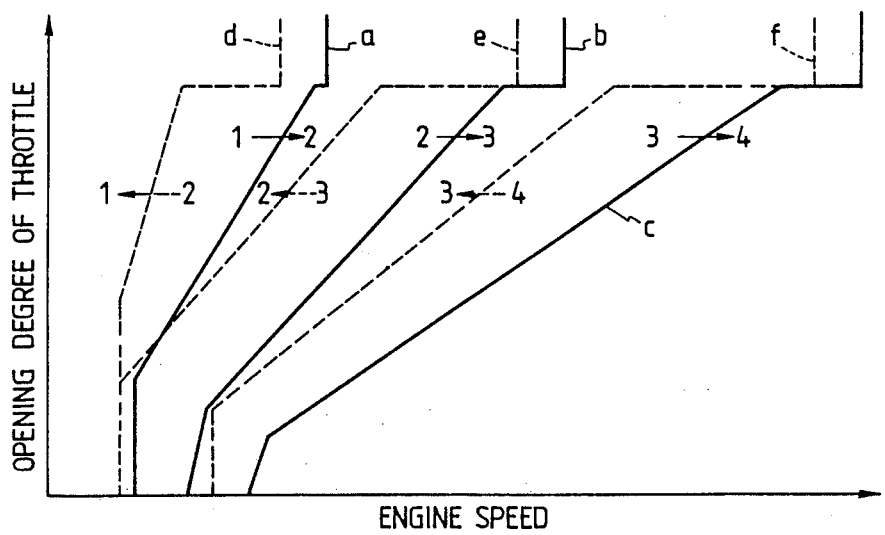
FIG. 4 shows a speed change characteristic map used for explaining the operation of the embodiment shown in FIG. 2.

On the occasion of the speed change control, in the transmission control unit 200, en engine load embodied by the throttle opening degree represented by the detection output signal St and the traveling speed of the vehicle represented by the detection output signal Sv are checked up on shifting-up and shifting-down lines in a predetermined speed change characteristic map, for example, as shown in FIG. 4, which has shifting-up lines a, b, and c for first to second shifting up (1→2), second to third shifting up (2→3) and third to fourth shifting up (3 4), respectively, and shifting-down lines d, e and f for second to first shifting down (2→1), third to second shifting down (3→2) and fourth to third shifting down (4→3), and a first to second shifting-up operation which causes a change from the first speed range to the second speed range, a second to third shifting-up operation which causes a change from the second speed range to the third speed range, a third to fourth shifting-up operation which causes a change from the third speed range to the fourth speed range, a second to first shifting-down operation which causes a change from the second speed range to the first speed range, a third to second shifting-down operation which causes a change from the third speed range to the second speed range, or a fourth to third shifting-down operation which causes a change from the fourth speed range to the third speed range is detected based on a result of the checking up.

When one of the shifting-down operations except the fourth to third shifting-down operation, that is, the second to first shifting-down operation or the third to second shifting-down operation which is apt to cause relatively large torque shock on the vehicle, is detected under a condition in which the vehicle engine 1 is operating with, for example, the throttle opening degree which is equal to or larger than $TH_1$ corresponding to one eighth the maximum value and the cooling water temperature which is equal to or 25 higher than $TW_1$ to or higher than 70° C., the command pulse signal Pj is supplied to the engine control unit 100 from the transmission control unit 200 after a predetermined period, for example, 100 msec, which is selected to correspond to time lag in operation of the power transmitting gear arrangement 20, has elapsed since the second to first or third to second shifting-down operation was detected, on the condition that a different shifting-up or shifting-down operation is not detected in the predetermined period.

In the ignition timing control by the engine control unit 100, a fundamental advanced angle of crank rotation corresponding to a fundamental ignition timing is determined based on the engine speed represented by the detection output signal Sn and the negative pressure in the intake passage represented by the detection output signal Sb, and when the command pulse signal Pj is supplied to the engine control unit 100 from the transmission control unit 200, a first retarding angle of crank rotation is provided for causing an actual ignition timing to be retarded compared with the fundamental ignition timing so as to suppress torque shock resulting from the speed change operation carried out in the automatic transmission 10. Further, when the knocking in the vehicle engine 1 represented by the detection output signal Sk is larger in magnitude than a predetermined value, a second retarding angle of crank rotation is provided for causing the actual ignition timing to be retarded compared with the fundamental ignition timing so as to suppress the knocking.

Under a condition in which the speed change control and the ignition timing control are thus carried out by the transmission control unit 200 and the engine control unit 100, respectively, in the case where a throttle opening degree Th is commenced to increase at a time point $t_0$ and the second to first or third to second shifting-down operation is detected at a time point $t_1$, as shown in FIG. 5A, the command pulse signal Pj is supplied to the engine control unit 100 from the transmission control unit 200 at a time point $t_2$ after a predetermined period Ta, which is selected to correspond to time lag in operation of the power transmitting gear arrangement 20, has lapsed from the time point $t_1$, as shown in FIG. 5B, and a retarding angle $\theta A$ is set to have an initial value $\theta a$ at the time point $t_2$, as shown in FIG. 5C. The retarding angle $\theta A$ is maintained to be $\theta a$ during a period $T_r$ from the time point t to a time point $t_3$ in which the clutches 31, 33, 38 and 35 and the brakes 36 and 44 in the power transmitting gear arrangement 20 work selectively for the speed change operation, and then reduced step by step by a small angle $\Delta\theta$ at each step after the time point $t_3$ so as to be zero at a time point $t_4$, as shown in FIG. 5C. An effective angle $\theta$ of crank rotation corresponding to the actual ignition timing is obtained by subtracting the retarding angle $\theta A$ from the fundamental advanced angle, so that a spark advance is reduced by the retarding angle $\theta A$ in a period from the time point $t_2$ to the time point $t_4$. Accordingly, a torque TR produced by the vehicle engine 1 and obtained on the output shaft 45 of the automatic transmission 10 is reduced after the time point $t_2$, as shown by a solid line in FIG. 5D, as compared with a torque obtained without the reduction in spark advance as shown in a broken line in FIG. 5D, so that the torque shock resulting from the second to first or third to second shifting-down operation is suppressed effectively.

Figure 6A:
Figure 6B:
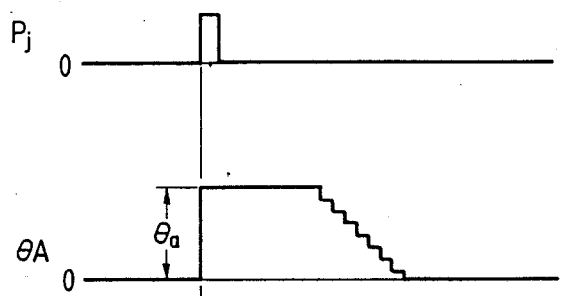
Figure 6C:
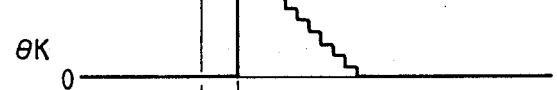
Figure 6D:
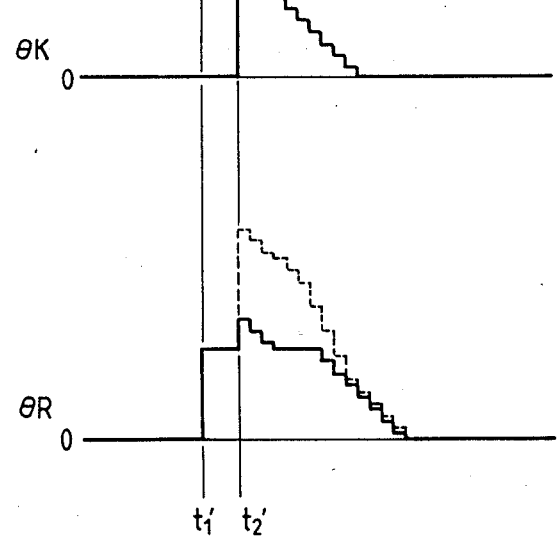

In the case where the command pulse signal Pj is supplied to the engine control unit 100 from the transmission control unit 200 and thereby the retarding angle $\theta A$ is set to have the initial value $\theta a$ at a time point $t_1'$, as shown in FIGS. 6A and 6B, and a knocking which is larger in magnitude than a predetermined value arises in the vehicle engine 1 at a time point $t_2'$ immediately after the time point $t_1'$, a retarding angle $\theta K$ of crank rotation is provided to have an initial value corresponding to the magnitude of the knocking, as shown in FIG. 6C. In such a case, a final retarding angle $\theta R$ of crank rotation is formed with one of the retarding angles $\theta A$ and $\theta K$ which is larger than the other of the retarding angles $\theta A$ and $\theta K$, as shown in 6D, and the effective angle $\theta$ corresponding to the actual ignition timing is obtained by subtracting the final retarding angle $\theta R$ from a fundamental advanced angle $\theta B$. Accordingly, the final retarding angle $\theta R$ is prevented from being large excessively, such as shown by a broken line in FIG. 6D, under a condition in which the retarding angles $\theta A$ and $\theta K$ are provided simultaneously and therefore the output of the vehicle engine 1 is prevented from being reduced in excess of necessity.

In the case where the second to first or third to second shifting-down is detected at a time point $t_a$ and the command pulse signal Pj is supplied to the engine control unit 100 from the transmission control unit 200 so that the retarding angle $\theta A$ is set to have the initial value θa at a time point $t_b$ after the predetermined period $T_a$ has lapsed from the time point ta, as shown in FIGS. 7A and 7B, and then a further second to first or third to second shifting-down operation is newly detected at a time point $t_c$ immediately after the time point $t_b$, the command pulse signal Pj is again supplied to the engine control unit 100 from the transmission control unit 200 and the retarding angle θA is reset to have the initial value θa at a time point $t_d$ after the predetermined period Ta has lapsed from the time point $t_c$, as shown in FIGS. 7A and 7B. Accordingly, the control for suppressing torque shock caused by each second to first or third to second shifting-down operation is surely achieved.

Further, in the case where the second to first or third to second shifting-down operation is detected at a time point $t_a'$ and the next second to first or third to second shifting-down operation is detected at a time point $t_b'$ before a time point $t_c'$ at which the predetermined period Ta has lapsed from the time point $t_a'$, as shown in FIGS. 8A and 8B, the command pulse signal Pj is not supplied to the engine control unit 100 from the transmission control unit 200 at the time point $t_c'$ but supplied to the engine control unit 100 from the transmission control unit 200 at a time point $t_d'$ after the predetermined period Ta has lapsed from the time point $t_b'$, as shown in FIGS. 8A and 8B.

b Consequently, the control for suppressing torque shock caused by each second to first and third to second shifting-down operation is surely achieved under a condition in which the second to first and third to second shifting-down operation is carried out in a relatively short period.

The control for suppressing the torque shock resulting from the speed change operation as described above is not carried out when the shifting-up operation is detected because it is not feared that the shifting-up operation brings about a relatively large torque shock on the output shaft 45 of the automatic transmission 10. Further, the control for suppressing the torque shock resulting from the speed change operation as described above is not carried out so as to prevent the torque TR from being reduced when the fourth to third shifting-down operation is detected, for the following reason. In a condition in which the third or fourth speed range is taken in the power transmitting gear arrangement 20, the 3-4 clutch 38 is maintained in engagement and thereby rotary inertia on the output shaft 45 of the automatic transmission 10 is relatively large, so that variations in torque on the output shaft 45 of the automatic transmission 10 are restricted. In addition to this, a variation in gear ratio in the power transmitting gear arrangement 20 caused by the fourth to third shifting-down operation is smaller than a variation in gear ratio in the power transmitting gear arrangement 20 caused by the second to first or third to second shifting-down operation. Consequently, it is not feared that the fourth to third shifting-down operation brings about a relatively large torque shock on the output shaft 45 of the automatic transmission 10.

The above described speed change control by the transmission control unit 200 is effected mainly by the microcomputer contained in the transmission control unit 200 and the ignition timing control by the engine control unit 100 is effected mainly by the microcomputer contained in the engine control unit 100.

Figure 9:
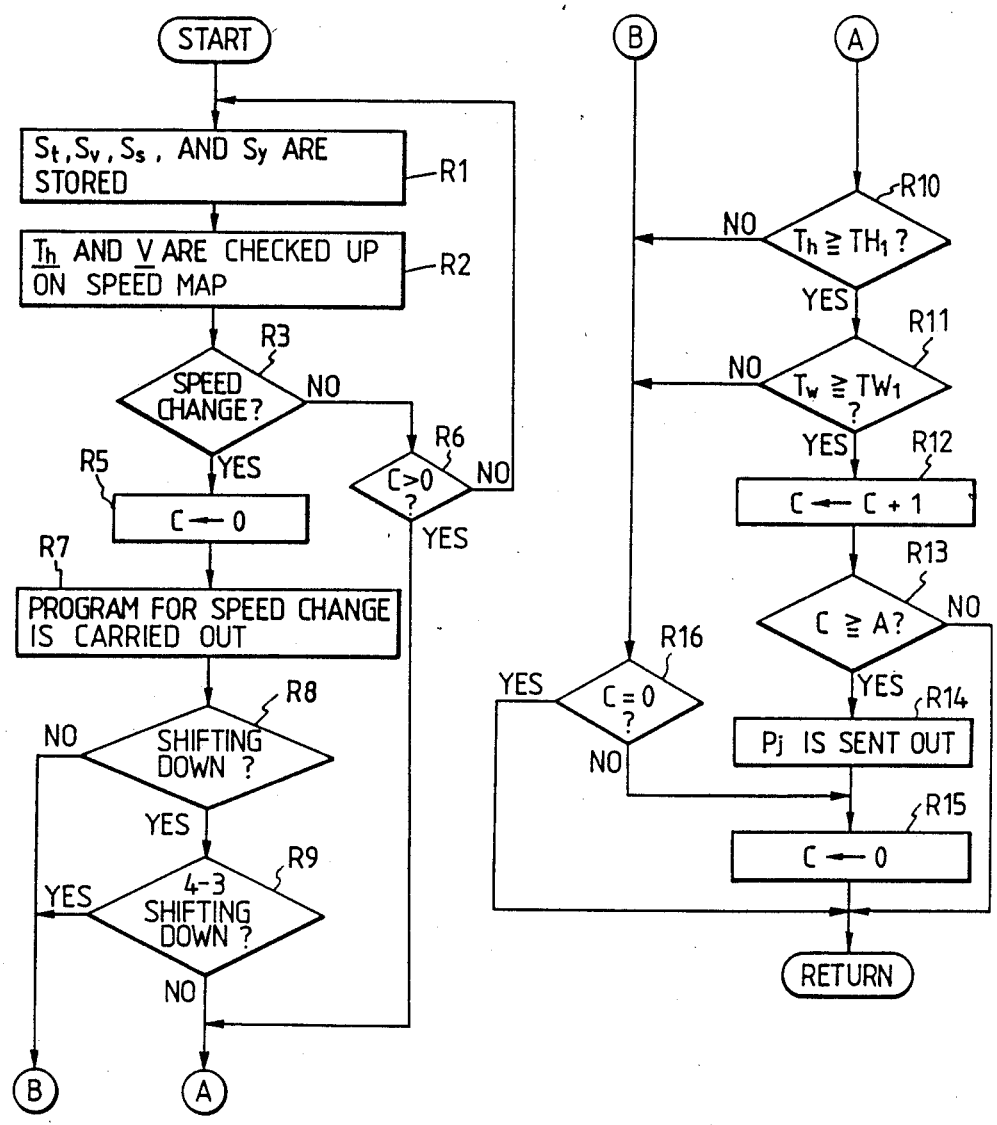

One example of an operation program for the speed change control is carried out in the microcomputer contained in the transmission control unit 200 in accordance with a flow chart shown in FIG. 9.

According to the flow chart shown in FIG. 9, first, in step R1, the detection output signals St, Sv, Ss and Sy are stored, and in step R2, throttle opening degree Th represented by the detection output signal St and vehicle traveling speed V represented by the detection output signal Sv are checked up on a speed change characteristic map, such as shown in FIG. 4, memorized in a memory contained in the transmission control unit 200. Then, in step R3, it is checked, based on a result of the checking up in the step R2, whether a speed change operation is to be performed or not. If the speed change operation is to be performed, a counted value C of a counter contained in the transmission control unit 200 is set to be 0, in step R5, and an operation program for speed change is carried out, in step R7.

After that, in step R8, it is checked whether the speed change operation is conducted for shifting down or not. When it is clarified in the step R8 that the speed change operation is conducted for sifting down, it is further checked whether the speed change operation is conducted for fourth to third shifting down or not, in step R9. If the speed change operation is not conducted for fourth to third shifting down, it is checked whether the throttle opening degree Th is equal to or larger than $TH_1$ or not, in step R10. If the throttle opening degree Th is equal to or larger than $TH_1$, it is checked whether cooling water temperature Tw represented by the detection output signal Sw is equal to or higher than $TW_1$ or not, in step R11. If the cooling water temperature Tw is equal to or higher than $TW_1$, the counted value C is increased by 1, in step R12, Then, in step R13, it is checked whether the counted value C is equal to or larger than a predetermined value A which corresponds to the predetermined period Ta or not. If the counted value C is smaller than the predetermined value A, the process returns to the step R1. On the other hand, the counted value C is equal to or larger than the predetermined value A, the command pulse signal Pj is sent out, in step R14. After that, in step R15, the counter is stopped to operate and the counted value C is set to be 0, then the process returns to the step R1.

When it is clarified in the step R3 that the speed change operation is not to be performed, it is checked whether the counted value C is larger than 0 or not, in step R6. If the counted value C is 0, the process returns to the step R1, and if the counted value C is larger than 0, the process advances to the step R10.

Further, in the case where the speed change operation is not conducted for shifting down as a result of the check in the step R8, the speed change operation is conducted for fourth to third shifting down as a result of the check in the step R9, the throttle opening degree Th is smaller than $TH_1$ as a result of the check in the step R10, or the cooling water temperature Tw is lower than $TW_1$ as a result of the check in the step R11, it is checked whether the counted value C is 0 or not, in step R16. If the step R1.

One example of an operation program for the ignition timing control is carried out in the microcomputer contained in the engine control unit 100 in accordance with a flow chart shown in FIGS. 10-a and 10-b.

According to the flow chart shown in FIGS. 10-a and 10-b, first, in step R21, the detection output signals Sn, Sc, Sw, Sk, Sb, St and Sx are stored, and then, the fundamental advanced angle θB of crank rotation corresponding to the fundamental ignition timing is calculated based on the engine speed represented by the detection output signal Sn and the negative pressure in the intake passage represented by the detection output signal Sb, in step R22.

Next, in step R23, it is checked whether throttle opening degree Th represented by the detection output signal St is equal to or larger than $TH_1$ or not. If the throttle opening degree Th is equal to or larger than $TH_1$, it is further checked whether cooling water temperature Tw is equal to or higher than $TW_1$, in step R24. When the cooling water temperature Tw is equal to or higher than $TW_1$, it is checked whether the command pulse signal Pj has been sent out or not, in step R26.

If it is clarified in the step R26 that the command pulse signal Pj has been sent out, the retarding angle $\theta A$ is set to have the initial value $\theta a$ in step R27 and a flag FR is set to be 1 in step R28. After that, a counted value U of a counter contained in the engine control unit 100 is set to be 0 in step R29, and the process advances to step R31.

In the step R31, the retarding angle $\theta K$, which is determined in another operation program for determining the retarding angle described later, is stored. Then, in step R32, it is checked whether the retarding angle $\theta A$ is larger than the retarding angle $\theta K$ or not. If the retarding angle $\theta A$ is larger than the retarding angle $\theta K$, the retarding angle $\theta A$ is adopted as the final retarding angle $\theta R$, in step R33, and if the retarding angle $\theta A$ is equal to or smaller than the retarding angle $\theta K$, the retarding angle $\theta K$ is adopted as the final retarding angle $\theta R$, in step R34.

After the retarding angle $\theta A$ or $\theta K$ is adopted as the final retarding angle $\theta R$, the effective angle $\theta$ of crank rotation corresponding to the actual ignition timing is calculated by subtracting the final retarding angle $\theta R$ from the fundamental advanced angle $\theta B$, in step R35. Then, in step R36, the ignition control signal SCq which corresponds to the effective angle $\theta$ obtained in the step R36 is produced and sent out to the igniter 8, and thereafter, the process returns to the step R21.

In the case where the throttle opening degree Th is smaller than $TH_1$ as a result of the check in the step R23 or the cooling water temperature Tw is lower than $TW_1$ as a result of the check in the step R24, the flag FR is set to be 0 in step R37 and the retarding angle $\theta A$ is set to be 0° in step R38. Then, the process advances to the step R31.

Further, when it is clarified in the step R26 that the command pulse signal Pj has not been sent out, it is checked whether the flag FR is set to be 1 or not, in step R40. If the flag FR is set to be 0, the process advances to the step R38, and if the flag FR is set to be 1, the process advances to step R41.

In the step R41, the counted value U is increased by 1, and then it is checked whether the counted value U is equal to or larger than a predetermined value E which is set to correspond to the period Tr, in step R42. If the counted value U is equal to or larger than the predetermined value E, the retarding angle $\theta A$ is renewed by subtracting the small angle $\Delta\theta$, in step 43, and it is checked whether the retarding angle $\theta A$ renewed in the step R43 is smaller than 0°, namely, negative or not, in step R44. If the retarding angle $\theta A$ renewed in the step R43 is smaller than 0°, the retarding angle $\theta A$ is set to be 0° in step R45, and the flag FR is set to be 0 in step R46, then the process advances to the step R32. If the retarding angle $\theta A$ is equal to or larger than 0 as a result of the check in the step R44, the process advances to the step R46 directly from the step R44. Further, if the counted value U is smaller than the predetermined value E, the process advances to the step R32 directly from the step R42.

Figure 11:
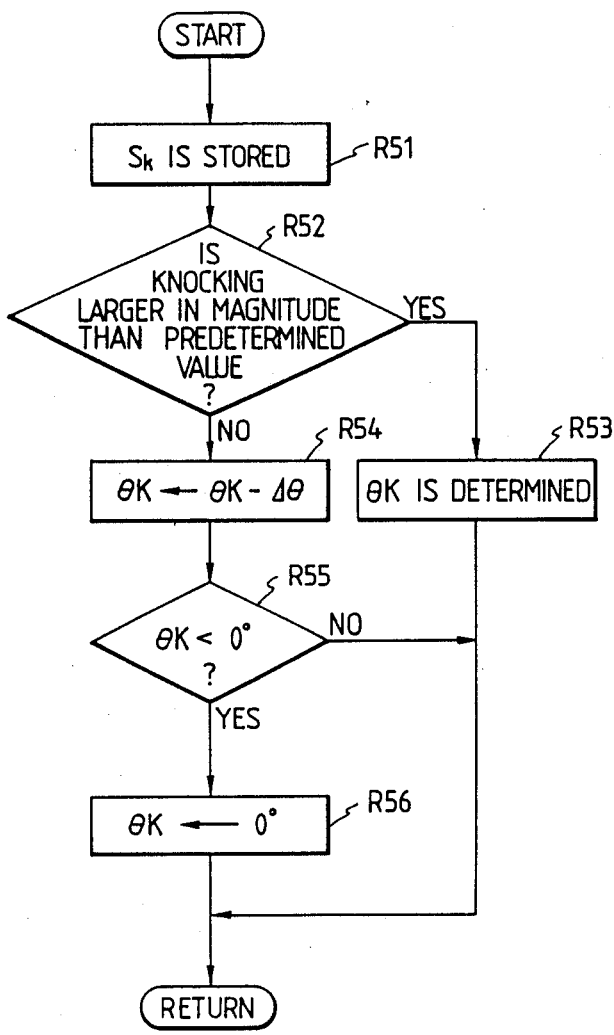

The operation program for determining the retarding angles $\theta K$ is carried out in accordance with a flow chart shown in FIG. 11 in the microcomputer contained in the engine control unit 100.

According to the flow chart shown in FIG. 11, in step R51, the detection output signal Sk is stored, and it is checked based on the detection output signal Sk whether the knocking in the vehicle engine 1 is larger in magnitude than a predetermined value or not, in step R52. If the knocking in the vehicle engine 1 is larger in magnitude than the predetermined value, the retarding angle $\theta K$ is determined in response to the magnitude of the knocking, in step R53, and the process returns to the step R51.

To the contrary, when it is clarified in the step R52 that the knocking in the vehicle engine 1 is not larger in magnitude than the predetermined value, the retarding angle $\theta K$ is renewed by subtracting the small angle $\Delta\theta$, in step R54. Then, it is checked whether the retarding angle $\theta K$ is smaller than 0°, namely, negative or not, in step R55. If the retarding angle $\theta K$ is smaller than 0°, the retarding angle $\theta K$ is set to be 0°, in step R56, and then the process returns to the step R51. Further, if the retarding angle $\theta K$ is equal to or larger than 0° as a result of the check in the step R55, the process returns to the step R51 directly from the step R55.

Although, in the above described embodiment, the retarding angle $\theta A$ is set to be 0 by the engine control unit 100 when the fourth to third shifting-down operation carried out in the automatic transmission 10 is detected by the transmission control unit 200 and the command pulse signal Pj is not supplied from the transmission control unit 200 to the engine control unit 100, the engine control unit 100 can be arranged to set the retarding angle $\theta A$ to be a value smaller than a value provided for the retarding angle $\theta A$ on the occasion where the second to first or third to second shifting-down is detected, so as to restrict the reduction of the torque TR caused by the ignition timing control when the fourth to third shifting-down operation is detected by the transmission control unit 200.

Further, although the ignition timing is controlled by the engine control unit 100 for reducing the torque TR so as to suppress the torque shock resulting from the speed change operation and the knocking in the vehicle engine 1 in the above described embodiment, the engine control unit 100 can be arranged to control one or more controllable subjects other than the ignition timing, for example, fuel supply to the vehicle engine 1 or intake air mass flow to the vehicle engine 1, for reducing the torque TR so as to suppress the torque shock resulting from the speed change operation and the knocking in the vehicle engine 1.

What is claimed is:

1. A control system for a vehicle engine coupled with an automatic transmission, the control system comprising:

torque controlling means operative to vary torque produced by the vehicle engine, in accordance with a controlled variable determined for controlling the torque, so as to suppress torque shock resulting from a speed change operation carried out in the automatic transmission, detecting means for detecting the speed change operation carried out to vary a gear ratio in a power transmitting gear arrangement provided in the automatic transmission, controlled variable setting means for determining said controlled variable in accordance with an operating condition of the vehicle engine and the speed change operation detected by said detecting means, and controlled variable revising means for varying said controlled variable so as to reduce variation in the torque brought about by said torque controlling means under a condition in which the speed change operation causing a change from one to another of speed ranges of relatively small gear ratios is detected by said detecting means, as compared with variation in the torque brought about by said torque controlling means under a condition in which the speed change operation causing a change from one to another of speed ranges of relatively large gear ratios is detected by said detecting means.

2. A control system according to claim 1, wherein said automatic transmission is accompanied with a control unit operative to control the speed change operation in said automatic transmission in accordance with a predetermined speed change characteristic defined by traveling speed of a vehicle and engine load.

3. A control system according to claim 1, wherein said torque controlling means is operative to control at least one of ignition timing for the vehicle engine and fuel supply to the vehicle engine so as to reduce the torque produced by the vehicle engine.

4. A control system according to claim 1, wherein said controlled variable setting means is operative to determine said controlled variable by means of combining at least a fundamental variable obtained based on the operating condition of the vehicle engine and a supplemental variable obtained in response to the speed change operation carried out in the automatic transmission.

5. A control system according to claim 2, wherein said controlled variable revising means is operative to set said supplemental variable to be zero when the speed change operation causing the change from one to another of speed ranges of relatively small gear ratios is detected by said detecting means.

6. A control system according to claim 1, wherein said controlled variable setting means is operative to determine said controlled variable in accordance with the operating condition of the vehicle engine and a shifting-down operation carried out in the automatic transmission.

7. A control system according to claim 5, wherein said power transmitting gear arrangement is operative to obtain four forward speed ranges and provided with a 2-4 brake device which is held in engagement when one of the second and fourth speed ranges is selected and a 3-4 clutch device which is held in engagement when one of the third and fourth speed ranges is selected, and said controlled variable revising means is operative to vary said controlled variable so as to reduce the variation in the torque brought about by said torque controlling means when the shifting-down operation causing a change from the fourth speed range to the third speed range is detected by said detecting means.

8. A control system for a vehicle engine coupled with an automatic transmission in which a speed range is automatically selected in accordance with a predetermined speed change characteristic defined by traveling speed of a vehicle and engine load, the control system comprising:

torque controlling means operative to vary torque produced by the vehicle engine so as to suppress torque shock resulting from a speed change operation carried out in the automatic transmission, detecting means for detecting the speed change operation carried out to vary a gear ratio in a power transmitting gear arrangement provided in the automatic transmission, controlled variable setting means for determining a controlled variable in accordance with an operating condition of the vehicle engine and the speed change operation detected by said detecting means, and controlled variable revising means for varying said controlled variable into a first revised controlled variable which is supplied to said torque controlling means to bring about a first variation in the torque when the speed change operation causing a change from one to another of speed ranges of relatively large gear ratios is detected by said detecting means and a second revised controlled variable which is also supplied to said torque control means to bring about a second variation in the torque smaller then the first variation in the torque when the speed change operation causing a change from one to another of speed ranges of relatively small gear ratios is detected by said detecting means.

9. A control system according to claim 8, wherein said torque controlling device is operative to control at least one of ignition timing for the vehicle engine and fuel supply to the vehicle engine so as to reduce the torque produced by the vehicle engine.

10. A control system according to claim 8, wherein said controlled variable setting means is operative to determine said controlled variable by means of combining at least a fundamental variable obtained based on the operating condition of the vehicle engine and a supplemental variable obtained in response to the speed change operation carried out in the automatic transmission.

11. A control system according to claim 10, wherein said controlled variable revising means is operative to set said supplemental variable to be zero when the speed change operation causing the change from one to another of speed ranges of relatively small gear ratios is detected by said detecting means.

12. A control system according to claim 8, wherein said controlled variable setting means is operative to determine said controlled variable in accordance with the operating condition of the vehicle engine and a shifting-down operation carried out in the automatic transmission.

13. A control system according to claim 12, wherein said power transmitting gear arrangement is operative to obtain four forward speed ranges and provided with a 2-4 brake device which is held in engagement when one of the second and fourth speed ranges is selected and a 3-4 clutch device which is held in engagement when one of the third and fourth speed ranges is selected, and said controlled variable revising means is operative to vary the controlled variable into said second revised controlled variable when the shifting-down operation causing a change from the fourth speed range to the third speed range is detected by said detecting means.

* * * * *